PRESSURE-SENSITIVE ELECTRICAL SWITCH AND APPLICATION THEREFOR

Original Filed Oct. 21, 1965 2 Sheets-Sheet 1

INVENTOR
RAPHAEL J COSTANZO
BY
Arthur G. Fattibene
ATTORNEY

INVENTOR
Raphael J Costanzo
BY Arthur T. Fattibene
ATTORNEY

United States Patent Office
3,386,067
Patented May 28, 1968

3,386,067

PRESSURE-SENSITIVE ELECTRICAL SWITCH AND APPLICATION THEREFOR

Raphael J. Costanzo, 119 Park Ave., Bridgeport, Conn. 06604

Division and continuation-in-part of application Ser. No. 511,573, Oct. 21, 1965. This application Apr. 24, 1967, Ser. No. 633,174
2 Claims. (Cl. 338—100)

ABSTRACT OF THE DISCLOSURE

The invention is directed to a pressure-sensitive electrical switch for controlling current flow through a circuit, and it is particularly advantageous for controlling SCR circuits. The pressure variable switch comprises a resilient porous-like or cellular material impregnated with a powdered electrical conducting substance sandwiched between a pair of contacts. When the impregnated cellular material is connected into a circuit, it will function as a variable pressure resistor switch whereby the resistance through the switch will vary the current flow in the circuit in accordance with the applied pressure.

This application is a division and a continuation-in-part of co-pending application Ser. No. 511,573 filed Oct. 21, 1965 which was a continuation-in-part application of application Ser. No. 320,892 filed Nov. 1, 1963, now abandoned.

Heretofore, there has been no known variable pressure-sensitive switch capable of variably controlling the flow of current through SCR circuits and/or solid state devices in a substantially linear manner in accordance with the applied pressure over the entire range. Efforts to attain control of a current through a circuit heretofore were restricted simply to the inclusion of simple on-off switches and/or the use of variable rheostats or potentiometers. However, the use of such potentiometers, rheostats and the like had the disadvantage that linear control through the full range was not possible. Also the physical makeup of a potentiometer or rheostat to attain the desired variable control over a circuit was generally complicated and difficult to fabricate, and therefore was relatively expensive. Also the inherent operation of a potentiometer or rheostat is such that variable control can be attained only in incremental steps and therefore it is incapable of any substantially linear performance. Consequently, infinite type control had not been heretofore possible over certain tool application where such infinite control was desirable.

Also, because of the inherent mechanical resistance due to friction and the like, the use of rheostats or potentiometers was not particularly suitable for controlling circuits subjected to extremely sensitive changes.

An object of this invention is to provide a pressure-responsive switch that is simple, rugged, sensitive and inexpensive to fabricate.

Another object is to provide an improved pressure-responsive switch having in effect no moving metallic parts.

Another object is to provide a pressure-responsive switch having the characteristic of low forward resistance and substantially infinite reverse resistance.

Still another object is to provide a pressure-responsive switch in which the resistance therethrough decreases in proportion to the increase in pressure subjected thereon.

Still another object is to provide a pressure-responsive switch that can be utilized in numerous and various types of applications.

Still another object is to provide a pressure-responsive switch that is silent in operation and from which the "contact bounce" is completely eliminated.

Still another object is to provide a pressure-responsive switch that can be in any size, shape or form.

Still another object is to provide an electrical switch in which there is a minimum of linear degradation as the resistance through the switch is decreased in proportion to the applied pressure.

The foregoing objects and other features and advantages are attained by an electrical switch which, in accordance with this invention, comprises a resilient porous-like or cellular material impregnated with an electrical conducting substance. Accordingly, when the impregnated cellular material is connected into an electrical circuit, it will function as a switch or variable resistor whereby the resistance therethrough will vary inversely to the pressure applied thereon. In one form of the invention, the impregnated porous or cellular-like resilient material may be sandwiched between a pair of floating contacts. In another form, the electrical contacts or ends of the conductors may be fixed or permanently secured in electrical contact with the impregnated material. In either event, the operation of the device is such that the resistance through the switch will vary with a minimum of linear degradation inversely to the pressure applied thereto. In another form of the invention, the switch means can be rendered magnetically operated by impregnating the cellular material with a magnetic material.

A feature of this invention resides in the provision that the switch is relatively simple in construction, can be inexpensively fabricated and is positive in operation.

Another feature is that the switch of the instant invention can be made in any desired shape, form or size, as for example, the switch can be round, square, or any other suitable regular or irregular shape or form.

Another feature resides in the provision that the instant switch is resistant to wear and can be readily subjected to wide ranges of temperature without adverse effects.

Another feature resides in the provision that the switch of the instant invention is relatively chemically inert and resistant to vapor, water or other liquids.

Still another feature of the invention resides in the provision that the switch has a minimum of linear degradation, resistance, noise and electrical angle.

Other features and advantages will become more readily apparent when considered in view of the drawings and description in which, FIG. 1 is a diagrammatic showing of a circuit utilizing the pressure-responsive switch or component construction of the instant invention.

Figure 1:
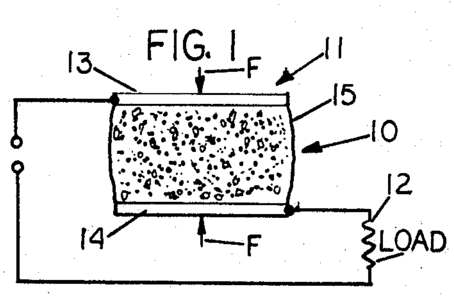

Referring to the drawings, there is illustrated in FIG. 1 an electrical circuit 10 in which the switch means or variable resistor means 11 constructed, in accordance with this invention, is electrically connected in circuit with any suitable load 12. The switch or variable resistor 11 comprises a pressure-responsive means in which the resistance therethrough will vary inversely to the force F applied. This is attained by sandwiching between a pair of opposed spaced apart electrical contacts 13, 14 a resilient porous or cellular-like or elastomeric material 15 impregnated with an electrically conductive powdered material. Sponge rubber, polyurethane foam, or other resilient cellular-like, foam or porous-like material 15 have been found to be acceptable in carrying out this invention. The electrical conducting material with which the foam or cellular material is impregnated comprises of powdered graphite, silver oxide, aluminum oxide and/or magnetic material, e.g. a powdered ferrous oxide or any other suitable electrical conducting substance or material and/or a mixture thereof depending on the desired resistance characteristics to be attained.

Figure 5:
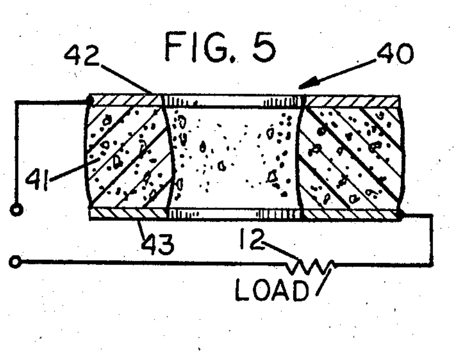
FIG. 5 is a section view taken along line 5—5 of FIG. 4.

In the illustrated embodiment, as viewed in FIG. 1, the piece of material 15 may be rendered rectangular in cross-section or cubical in form. However, it will be apparent that the material may be shaped to assume any desired size or form depending on the specific application. In FIG. 5, the material is shown in a round or doughnut shape.

Accordingly, contacts 13, 14 are disposed on either side of the material 15 so that the impregnated material 15 is sandwiched therebetween. The contacts may comprise either floating contacts and/or contacts permanently fixed or secured to the material. The contacts 13, 14 when fixed to the material 15 may be secured with an epoxy silver or other suitable conductive glue or adhesive.

The arrangement is such that the inherent resiliency of the material 15 from which the switch is made will normally maintain the contacts 13, 14 sufficiently far apart so that the resistance therethrough is infinite. When a pressure or force F is applied to the switch, as indicated to overcome the resiliency or bias of the material 15, the respective contacts are displaced toward one another. When this occurs, the impregnated material sandwiched therebetween is compressed causing the resistance therethrough to be progressively decreased as the pressure is increased. Consequently, the current flow through the circuit, as in FIG. 1, is controlled or regulated accordingly. When the pressure or force F on the switch 11 is relieved, the inherent resiliency of the material 15, from which the switch 11 is made, will move or return the contacts 13, 14 to their outermost position, and the material is again repositioned so that the resistance therethrough is again made infinite.

From the foregoing, it will be noted that the operation and action of the switch 11 is positive and silent. Also its structure renders it resistant to wear and the elements.

Figure 2:
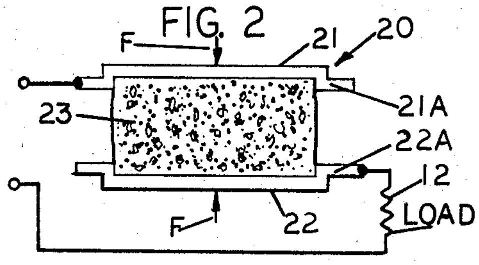
FIG. 2 illustrates a diagrammatic electric circuit in which a modified form of the construction is utilized.

FIG. 2 illustrates a slightly modified switching construction 20 of the invention. In this form, each of the opposing contacts 21, 22 is provided with a circumscribing flange portion 21A, 22A disposed inwardly from the opposed surfaces of impregnated material 23. In this form of the invention, the arrangement of the contacts 21, 22 is such that when maximum force F is applied to the contacts 21, 22 of the switch, the material 23 therebetween is compressed so that the inwardly turned flanges 21A, 22A ultimately will make contact, and thereby minimize the resistance through the switch. In all other respects the operation and construction of the switch 20 of FIG. 2 is similar to that of FIG. 1 as hereinbefore described.

Figure 3:
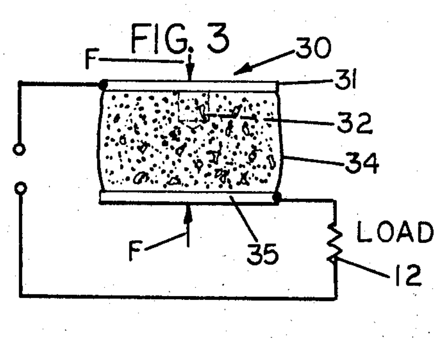
FIG. 3 is a showing of still another modified form of the construction.

FIG. 3 illustrates a further modification of the invention. In this form of the invention the construction of the switch 30 is substantially similar to that described with reference to FIG. 1 with the exception that one of the contacts 31 may be provided with a limiting means in the form of a projection 32 extending inwardly of the impregnated material 34 sandwiched between contacts 31, 35. Thus, it will be noted that when the pressure or force F is applied to the contacts 31, 35 the projection 32 will limit the spacing between the contacts. Thus appropriate sizing of the limiting means 32 can determine the minimum resistance desired through a given switch construction. If desired, the projection 32 may be formed of an electrically conducted material so that in the maximum compressed position of the switch 30 the contacts 31, 35 are brought into electrical engagement with one another through the projection 32.

Figure 4:
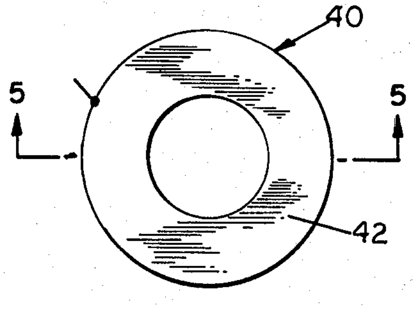
FIG. 4 is a plan view of still another modified form of the invention.

FIGS. 4 and 5 are directed to a modified embodiment to illustrate how the construction of the instant invention is susceptible to constructions of any size, shape and form. In this form of the invention the switch 40 is constructed in the shape of a doughnut. As shown, the impregnated material 41 is shaped as an angular member which is sandwiched between a pair of angular contacts 42, 43. In operation, switch 40, disclosed in FIGS. 4 and 5, is similar in all respects to that described with reference to FIG. 1. The only distinction therebetween is the geometric configuration of the switch.

Accordingly, the switch constructions of this invention are applicable to numerous and various types of applications, as for example, the switch may be utilized to control solid state devices such as SCR transistors, or to control cold cathode tubes, potentiometers and the like. The switch constructions can be also used in systems to measure respiratory rate, blood pressure, blood pulse and other physiological pressure-responsive applications. The switch is also applicable for use as depth gauges, altimeters, burglar alarms, conventional switching devices, on-off switching means, or it may also be utilized with relays or other electrical mechanical-type devices in which pressure is used to render a mechanism or device operational.

In accordance with this invention, the switch may be constructed so as to render it magnetically operable. This is attained simply by impregnating in the foam or cellular material a material including a magnetic conducting substance, e.g. ferrous oxide. Thus a switch so impregnated, in accordance with this invention, can be rendered operatively by application of magnetic forces thereon.

Figure 8:
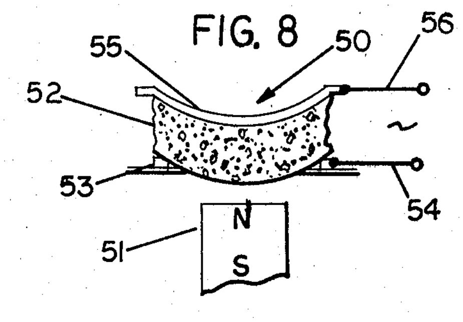
FIG. 8 is another modified form of the switch means.

FIG. 8 illustrates a switch component 50 illustrating a construction which renders the same readily operable by a magnetic field created by a magnet 51. As shown, the switching device 50 of FIG. 8 comprises a layer of foam or cellular material 52 which is impregnated with electrical conducting material including ferrous oxide. Since ferrous oxide constitutes an element of the composition, it is to be noted that the foam 52 so impregnated is rendered attracted to a magnetic field disposed adjacent thereto. In the form of the invention illustrated in FIG. 8, the layer 52 of impregnated cellular material is seated or connected to a rigid non-flexible conductor 53 which in turn is connected to a conduit 54 which is adapted to connect with a source of electrical power. As shown, the rigid non-flexible conductor 53 is illustrated as comprising an angular or ring-shaped member by which the switch element 50 may be supported. The other conductor 55 is formed of a flexible material such as aluminum foil. Accordingly, the other line or conduit 56 of the electrical circuit is electrically connected to the flexible conductor 55. Accordingly, in operation, it will be noted that when the switch element of 50 is exposed to a magnetic field, the attraction between the ferrous oxide impregnated in the cellular layer 52 which is attracted to the magnet will cause a compression of the cellular layer 52 giving a change in the output ohmic resistance thereby permitting a current to flow through the conductors 54 and 56.

Figures 6, 7:
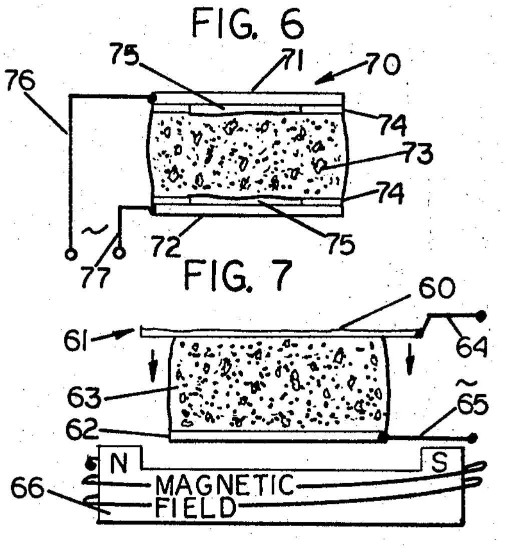
FIG. 6 is a modified form of the invention.
FIG. 7 is still another modified form of the invention.

FIG. 7 illustrates another modified form of the invention. In this form of the invention, one of the conductors 60 of switch means 61 is formed of a rigid flat magnetically attracted material, as for example, iron or other ferrous material. The other conductor 62 is formed of a suitable flexible electrical conducting material. Accordingly, the layer of cellular foam 63 is likewise impregnated with a substance similar to that impregnating the foam layer 52 of FIG. 8. Consequently, it will be noted that in the position illustrated in FIG. 7 there are illustrated the respective contacts 60 and 62 in a position which are sufficiently spaced apart so that the resistance therethrough is infinite. Therefore, to permit current to flow through the circuit defined by conduits 64 and 65, the magnet 66 is energized to create a magnetic field which will tend to attract the conductor 60 supported. Since the conductor 60 is made of a magnetically attracted material, it will assist the attraction or compression of the cellular material 63 which is also impregnated with ferrous oxide material. Upon compression of the switch means 61 due to the influence of the magnetic field thereon, it will be noted that the cellular layer 63 is compressed causing the resistance therethrough to be progressively decreased as the magnetic flux operating thereon is increased. Consequently, a current flows through the circuit which is controlled or regulated in accordance with the magnetic field applied thereon.

FIG. 6 illustrates another form of switch means in accordance with the instant invention. In this form of the invention, the switch means 70 is arranged so that the opposed conductors 71 and 72 are electrically insulated from the layer 73 of impregnated foraminous material. Accordingly, suitable fiber washers 74 may be interposed between the layer of foraminous material 73 which is impregnated as hereinbefore described from the respective electrical conductors 71 and 72. Accordingly, an insulating air space 75 is interposed between each conductor 71 and 72 and the impregnated layer of foraminous material 73. In this form of the invention, it is desirable to make the conductors 71 and 72 of a suitable flexible material so that when a pressure is applied thereto, the conductors 71 and 72 will deform so as to make contact with the layer of impregnated foraminous material 73. Accordingly, when a force is applied causing the conductors 71 and 72 to deform so as to make contact with the conducting particles impregnated in the foraminous material, the resistance through the switching means is decreased in proportion to the amount of pressure applied thereto and consequently, current will flow through the circuit defined by conductors 76 and 77.

Figure 9:
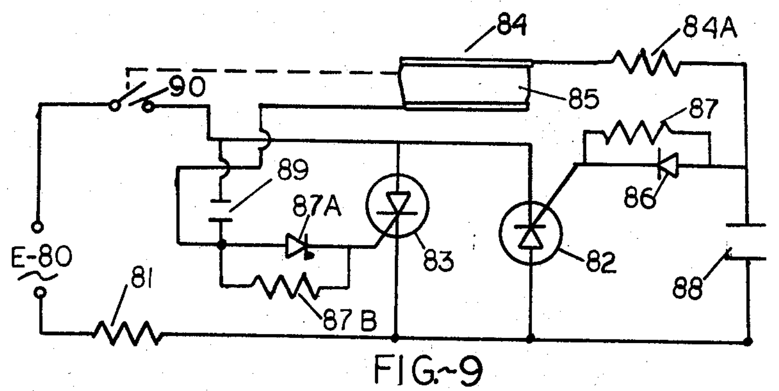
FIG. 9 illustrates a circuit embodying the invention.

FIG. 9 illustrates an SCR circuit in which the pressure variable switch herein described is utilized to control the current therethrough in accordance with applied pressure. Referring to FIG. 9, the circuit is energized by an alternating source of current 80 which supplies a continuously variable symmetrical current to a load 81 which may comprise any suitable type of electrical load, e.g. a lamp, a motor, etc.

The circuit includes a silicon-controlled rectifier 82 and a second silicon-controlled rectifier 83 which are inversely wired in parallel so that the respective polarities are reversed. The two SCR's 82, 83 are connected across the AC supply 80 and in series with the load 81. Connected in the circuit for controlling the current flow therethrough is a pressure-sensitive switch 84. The switch 84 comprises any of the structures similar to that hereinbefore described, e.g. FIGS. 1, 6, 7 and 8, wherein the foam or cellular material is impregnated with an electrical conducting material as herein specified.

If desired, a variable or adjustable means may be disposed adjacent the pressure-sensitive switch 84 to vary the resistance thereof and/or to maintain the resistance thereof at a given setting. Such variable or adjusting means may comprise a set screw which can be turned to exert the desired force on the switch 84 or the same may be magnetically energized in a manner similar to that described with respect to FIGS. 7 and 8.

The gate of the rectifier 82 is connected in circuit with a triggering diode 86 and an associated resistor 87. A capacitor 88 is interposed between the gate of rectifier 82 and the line. A singular circuit is provided for the gate of the rectifier 83 which also includes a triggering diode 87A, and associated resistor 87B. A capacitor 89 is connected in the gate circuit of rectifier 83.

The gate circuit of the two rectifiers 82, 83 is bridged by a resistive circuit which includes the variable pressure-sensitive switch 84 and a fixed resistor 84A. If desired, a main on-off switch 90 may be interposed in the circuit to place the circuit in a ready state. The switch 90 may comprise a mutually actuated switch or it may be mechanically connected to switch 84.

With the circuit illustrated each half cycle of the AC current is controlled by one or the other of rectifiers 82 and 83 in accordance with the applied pressure exerted on switch 84. For example, when switch 90 is closed and a force or pressure is applied to switch 84, the first half cycle of the voltage begins to build across one of the rectifiers. At this stage, silicon-controlled rectifier 82, for example, has not yet been triggered so that it will not conduct, and the other rectifier, e.g. 83 is positioned in reverse polarity to the applied voltage. However, an AC current path is established through the series connection between capacitor 88, resistor 84A. Accordingly, the voltage on one side of capacitor 88 builds until it exceeds the break-down voltage of the diode 86 and establishes a current path from gate to cathode of the silicon-control rectifier 82 causing the rectifier to fire and thereby conduct load current for the remainder of the half cycle. The length of time required for the capacitor 88 to build up to the triggering voltage is a function of the RC timing constant which is set by control of the variable sensitive switch 84. During the portion of the cycle prior to firing of the silicon-control rectifier 82, the voltage is of course building up across capacitor 89. However, as previously described, the voltage across the rectifier 83 is reversed in relation to its permitted current flow.

Upon reversal of the voltage at source 80, all polarities change and the silicon-control rectifier 82 stops conducting. The reverse action now takes place in exactly the same manner but the voltage build-up across the capacitor 89 in the reverse direction allows triggering current to flow through break-down diode 87A into the gate circuit of the silicon-control rectifier 83 so that after the proper period of time, this silicon-control rectifier conducts load curent. It will be noted that a resistor 87, 88 is connected across each diode 86, 87. These resistances are of a high ohmic value. For example, in one embodiment, each resistor has a value of 62,000 ohms. These resistors are useful in preventing flicker on low-brightness settings. This flicker is apparently the result of incomplete discharge of the capacitor when its associated rectifier goes from the conducting to non-conducting state. The presence of a residual charge on the capacitor can cause significant delay in the subsequent reverse voltage build-up of the triggering circuit that a complete misfire can occur when the lower settings of the brightness controls.

Figure 10:
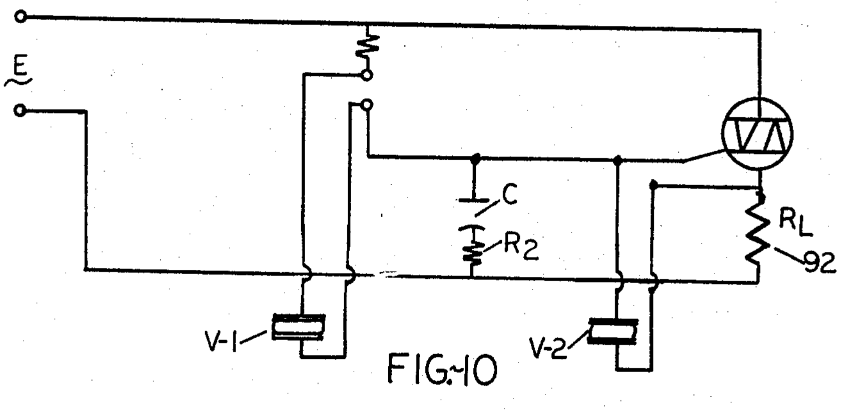
FIG. 10 illustrates another circuit embodying the invention.

FIG. 10 illustrates a latching circuit in which the pressure-sensitive means of FIG. 1 may be employed.

The two variable resistance pressure switches V1 and V2, as seen in the circuit of FIG. 10, results in latching the symmetric AC power line voltage. Thus for the first time, enabling a user to turn circuits on and off without the movement of any mechanical contact. Also, this arrangement allows for complete silence in operation and consequently, a minimum of maintenance is necessary. For all practical purposes, an unlimited life is provided to the circuit. It will be seen that the pressure variable switches V1 and V2 are connected to a silicon-control rectifier which is illustrated as being bi-directional. Accordingly, the silicon-control bi-directional rectifier, in natural state, blocks the application of the line voltage to the load 92.

When the gate circuit is triggered, the silicon-control rectifier switches into a conducting state, thus allowing line voltage to be supplied to the load. The gate is at the same potential as the anode of the silicon-control rectifier. The capacitor C charges to the load voltage through R2. When the line voltage reverses at the end of a half cycle, capacitor C discharges through the silicon-control rectifier gate and load thereby triggering the silicon-control rectifier for the next half cycle.

Due to the bilateral trigger characteristics of the silicon-control bi-directional rectifier, this action continues on each half cycle resulting in latching of the AC line voltage across the load. When the circuit is to be turned off, pressure variable switch 2 is momentarily closed, thus shunting the discharge of current of C around the gate of the silicon-control bi-directional rectifier thus unlatching the circuit. In this manner, the pressure variable switches V1 and V2 are valuable or have application to SCR circuitry. Accordingly, such pressure variable switches can be used on all dimming, latching and SCR circuits as shown in FIG. 10 or in solid state devices such as transistors, diodes, magnetic amplifiers, etc.

Figure 11:
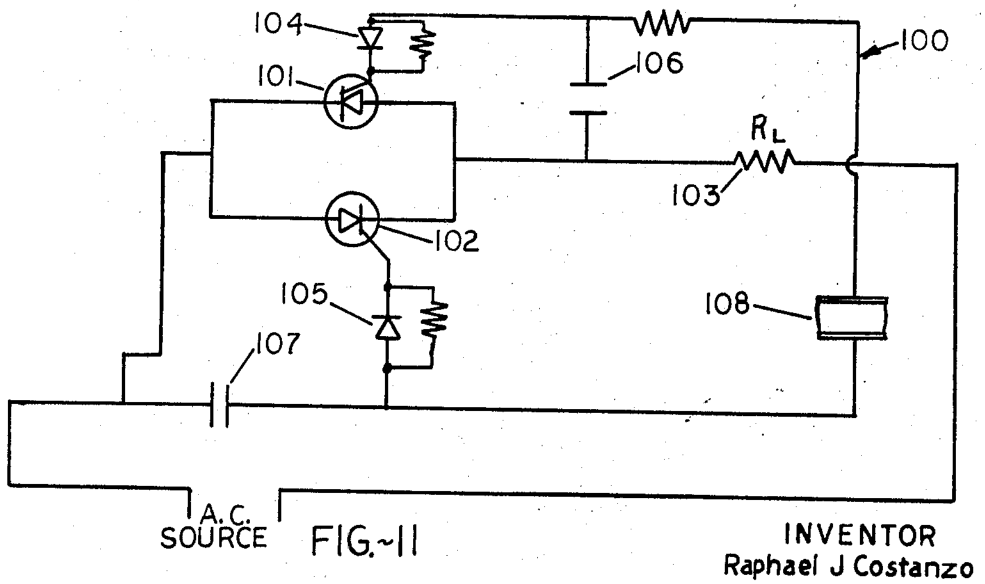
FIG. 11 illustrates another modified SCR circuit.

FIG. 11 illustrates another modified AC circuit 100. In this circuit two SCR 101, 102 are wired in inverse parallel into one side of the line and in series with a load 103. The gate of each SCR is connected in circuit with a triggering diode 104 and 105 respectively. Operatively associated with each of the respective triggering diodes is a capacitor 106 and 107. Bridging the respective diodes 104, 105 is a pressure-sensitive switch 108 constructed as herein described with reference to FIGS. 1, 4, 6, 7 or 8.

In the circuit 100, both half cycles of the AC voltage are controlled therein. When the pressure-sensitive switch 108 is in a relaxed state or position the resistance is extremely high. Thus there is no current flow to the load 103, and if such load 103 is a lamp or motor it is rendered inoperative. This is because the resistor/capacitor and diode network attenuate and phase retarding the gate signals so that the SCR's cannot fire. Progressive pressure applied on switch 108 reduces the resistance thereof, thus advancing the firing angle of the SCR's and allowing the SCR's to conduct for longer portions of the cycle going from off to completely on in incremental amounts depending on the amount of pressure applied on switch 108. Accordingly, in one half of the cycle the current flows through one SCR and in the other half of the cycle the current flows through the other SCR.

The foregoing circuit has particular application in controlling the speed of many appliances which are motor-operated. For example, the circuit 100 is particularly applicable for applying the speed of an AC powered tool, e.g. a hand drill. In such instances the pressure switch is operatively associated with the trigger of such drill so that the speed of the drill bit is varied in accordance with the applied pressure on the trigger. In lieu of a trigger means as such, the tool or appliance may be provided with a handle portion which has a deformable portion that is operatively associated with the switch 108. Thus by applying pressure on the deformable portion of the housing or handle, the speed of the motor driven tool is governed accordingly.

What is claimed is:

1. A pressure-sensitive electrical switch comprising:
a pair of opposed, spaced-apart electrical contacts adapted to be connected into an electrical circuit, a resilient dielectric material sandwiched between said contacts in contiguous relationship thereto,
and a composition of finely divided, electrically conductive powdered material impregnated into said dielectric material so that upon the application of a force said contacts are freed for relative movement to compress therebetween said impregnated material to result in a decreasing of the electric resistance therethrough in a substantially linear manner in proportion to the applied force,
said composition of finely divided material includes powdered, ferrous oxide for rendering said switch operable by the influence of a magnetic field thereon, and means for fixing one of said contacts against movement and forming the other of said contacts of a flexible conducting material, and
means defining a magnetic field disposed opposite the ridgedly disposed contact so that upon energization of said magnetic field, the first oxide particles impregnated in said dielectric material are attracted causing the latter to compress thereby decreasing the resistance therethrough in proportion to the magnitude of said magnetic field.

2. A pressure-sensitive electrical switch comprising:
a pair of opposed spaced-apart electrical contacts adapted to be connected into an electrical circuit,
a resilient dielectric material sandwiched between said contacts in contiguous relationship thereto,
and a composition of finely divided electrically conductive powdered material impregnated into said dielectric material so that upon the application of a force, said contacts are free for relative movement to compress therebetween said impregnated material to result in a decreasing of the electrical resistance therethrough in a substantially linear manner in proportion to the applied force,
and including means for electrically insulating said impregnated material from said contacts by defining an air space between said impregnated material and each of said contacts, and
said contacts being rendered flexible so that upon the application of a force thereon, said contacts are caused to flex across said air space to make electrical contact with said impregnated material.

References Cited

UNITED STATES PATENTS

| | | | |
|---|---|---|---|
| 740,787 | 10/1903 | Vetter | 338—114 X |
| 1,221,327 | 4/1917 | Honold | 338—103 X |
| 1,243,738 | 10/1917 | Honold | 338—116 X |
| 2,305,717 | 12/1942 | La Bell | 338—114 |
| 2,375,178 | 5/1945 | Ruben | 338—99 X |
| 2,445,660 | 7/1948 | Bruestle | 338—114 |
| 2,660,640 | 11/1953 | Wolf | 335—280 X |
| 2,690,489 | 9/1954 | Jarret et al. | 338—114 X |
| 2,734,978 | 2/1956 | Bulgin | 338—114 |
| 3,125,739 | 3/1964 | Deibel et al. | 338—99 |

ROBERT K. SCHAEFER, *Primary Examiner.*

H. J. HOHAUSER, *Assistant Examiner.*

UNITED STATES PATENT OFFICE

CERTIFICATE OF CORRECTION

Patent No. 3,386,067 May 28, 1968

Raphael J. Costanzo

It is certified that error appears in the above identified patent and that said Letters Patent are hereby corrected as shown below:

In the heading to the printed specification, line 4, "119 Park Ave." should read -- 119 Park Street --.

Signed and sealed this 2nd day of December 1969.

SEAL)

ttest:

dward M. Fletcher, Jr.

ttesting Officer

WILLIAM E. SCHUYLER, JR.

Commissioner of Patents